(12) United States Patent
Yun et al.

(10) Patent No.: US 7,799,839 B2
(45) Date of Patent: Sep. 21, 2010

(54) POROUS MATERIAL HAVING HIERARCHICAL PORE STRUCTURE AND PREPARATION METHOD THEREOF

(75) Inventors: Hui-suk Yun, Gyeongsangnam-do (KR); Seung-Eon Kim, Gyeongsangnam-do (KR)

(73) Assignee: Korea Institute of Machinery & Materials, Daejeon (KR)

( * ) Notice: Subject to any disclaimer, the term of this patent is extended or adjusted under 35 U.S.C. 154(b) by 620 days.

(21) Appl. No.: 11/775,463

(22) Filed: Jul. 10, 2007

(65) Prior Publication Data

US 2008/0103227 A1 May 1, 2008

(30) Foreign Application Priority Data

Oct. 27, 2006 (KR) ................. 10-2006-0105013

(51) Int. Cl.
*A61K 33/42* (2006.01)
(52) U.S. Cl. .................. 521/61; 521/62; 521/63; 521/77; 521/79; 521/81; 521/85; 521/86; 521/92; 521/186; 521/187
(58) Field of Classification Search .......... None
See application file for complete search history.

(56) References Cited

FOREIGN PATENT DOCUMENTS

| KR | 10-2000-00175142 | 12/2000 | |
|---|---|---|---|
| KR | 10-2003-0023568 | 3/2003 | |
| WO | WO 2008/028036 | * | 3/2008 |

OTHER PUBLICATIONS

In-Cheol Kang, et al., Fabrication of Continuously Porous Alumina Bodies by Multi-Extrusion . . . , Journal of the Korean Ceramic Society, vol. 41, No. 7, pp. 560-566, 2004.
Dean-Mo Liu, Fabrication and Characterization of Porous . . . , Biomaterials, vol. 17, No. 20, 1996.
N. Ozgur Engin, et al., Manufacture of Macroporous Calcium . . . , Journal of the European Ceramic Society, vol. 19, pp. 2569-2572, 1999.
C.T. Kresge, et al., Ordered Mesoporous Molecular Sieves . . . , Nature, vol. 359, 1992.
Wai-Yee Yeong, et al., Rapid Prototyping in Tissue Engineering . . . , Trends in Biotechnology, vol. 22, No. 12, 2004.

* cited by examiner

*Primary Examiner*—Irina S Zemel
(74) *Attorney, Agent, or Firm*—Lucas & Mercanti, LLP

(57) ABSTRACT

Disclosed are porous material having hierarchical pore structure and preparation method thereof. A method of synthesizing a nanoporous material having high functionality as a support for bioactive material is combined with a three-dimensional rapid prototyping technique. Thereby, the porous material of the invention has interconnected pores of respective size regions and uneven surface corresponding to each size region, and thus conditions favorable for adhesion, division, proliferation, movement, and differentiation of cells are provided, thereby exhibiting efficient applications in various fields, in addition to bone fillers, restorative materials, and scaffolds.

11 Claims, 14 Drawing Sheets

POROUS MATERIAL HAVING HIERARCHICAL PORE STRUCTURE AND PREPARATION METHOD THEREOF

CROSS-REFERENCE TO RELATED APPLICATION

This application claims the benefit of Korean Patent Application No. 10-2006-0105013, filed Oct. 27, 2006 in the Korean Intellectual Property Office, the disclosure of which is incorporated herein in its entirety by reference.

BACKGROUND OF THE INVENTION

1. Field of the Invention

The present invention relates to porous material having hierarchical pore structure and preparation method thereof, and, more particularly, to a method of synthesizing a nanoporous material having high functionality as a support for bioactive material, which is newly combined with a three-dimensional rapid prototyping technique, thereby enabling practical application of a nanoporous material having hierarchical pore structure as a scaffold for tissue regeneration.

2. Description of the Related Art

In the medical field at present, regenerative medicine, which is receiving attention as a next-generation medical technique, in particular, medical treatment for artificially forming tissue by separating cells from tissue to be regenerated, culturing the cells, and inoculating the cells to an appropriate biomaterial to thus proliferate them, has raised a lot of interest. Such treatment requires a predetermined scaffold for supporting the cells to prevent the separation from connective tissue after implantation, and there is a need for the development of scaffolds having superior tissue compatibility and cell adhesion.

Conventionally, as the scaffold for supporting the cells, a polymer scaffold has been mainly used. To compensate for bone loss, a bone regeneration material includes calcium phosphate-based ceramic materials, including hydroxyapatite and tricalcium phosphate, and ceramic materials, including bioglass and calcium carbonate, having high mechanical strength and high bone compatibility. Furthermore, with the goal of serving as the bone regeneration material, a structure having three-dimensional pores is required. Methods of synthesizing a scaffold having three-dimensional pores include a preparation method (Korean Patent No. 10-331990) comprising preparing a fine ceramic powder slurry, applying the slurry on a polymer scaffold including polyurethane, and conducting heat treatment to remove polyurethane and to form a porous network, a preparation method using a multiple compression process (Byong-Taek Lee et al., Journal of the Korean Ceramic Society, 560, 41, 2004), a preparation method (Korean Unexamined Patent Publication No. 10-2003-0023568) through mutual contact of spherical ceramic particles, and a preparation method comprising mixing an organic material, such as polyvinylbutyral (Dean-Mo Liu, Biomaterials, 1955, 17, 1996) or methylcellulose (N. Ozgur Engin et al., Journal of the European Ceramic Society, 2569, 19, 1999), with slurry of fine ceramic powder. Although the scaffold thus obtained is composed of continuously connected macropores (having a size from ones to hundreds of micrometers), the structural control of the ceramic frames defining the pores is not conducted, and thus, although biocompatibility is exhibited, the functionality of the ceramic frame and histological osteoinduction are poor. Further, after the treatment, most of the scaffold has been confirmed to be separated from osseous tissue due to the intervention of connective tissue. Accordingly, there is required a biodegradable substitute material, which has superior biocompatibility and osteoinduction as well as osteoadhesion capabilities, may exhibit a predetermined function through the incorporation of a predetermined drug, and may be substituted into regenerative bone through appropriate absorption upon implantation.

If the ceramic frame of the three-dimensional scaffold defining macropores is composed of interconnected nanopores and semi-macropores, the specific surface and porosity are increased, and as well, cell adhesion is increased by the uneven surface. In the case where proliferation factors, nutrients, oxygen, or drugs are adsorbed into the nanopores, cell necrosis in the scaffold, which is regarded as the problem with a three-dimensional structure, may be expected to decrease, along with the improvement of cell proliferation and differentiation. Further, the scaffold is expected to act as a functional scaffold to regenerate bone and to heal inflammation through the adsorption of a drug, such as an anticancer agent or an anti-inflammatory agent.

As methods of synthesizing such nanopores, a polymer template method (C. T. Kresge et. al. 4, Nature, 710, 359, 1992), which facilitates the control of pore size or pore structure and also provides a giant specific surface area, is considered to be effective. The polymer template method is applied together with the above-mentioned three-dimensional scaffold synthesis technique, thereby making it possible to synthesize a scaffold having nanopores and macropores.

In addition, when two or three synthesis techniques, including the combination of the polymer template method and the three-dimensional scaffold synthesis technique, are applied together, the synthesis of a scaffold having hierarchical pores, including two kinds of pores of nano/macro size or three kinds of pores of nano/semi-macro/macro size, is expected to be enabled. Particularly, as a method of controlling the macropores, a typical three-dimensional rapid prototyping technique (Wai-Yee Yeong et al., Trends in Biotechnology, 643, 22, 2004) for forming a scaffold having a structure controlled in three dimensions using a polymer is applied, and consequently there are great expectations that a scaffold having a more controlled pore structure will be able to be synthesized.

SUMMARY OF THE INVENTION

Accordingly, an object of the present invention is to provide a porous scaffold with a hierarchical pore structure, including two kinds of pores of nano/macro size or three kinds of pores of nano/semi-macro/macro size.

Another object of the present invention is to provide a method of preparing a porous scaffold having hierarchical pores using two or three synthesis techniques, including combination of the polymer template method and the three-dimensional scaffold synthesis technique.

In order to accomplish the above objects, the present invention provides porous material having hierarchical pore structure of a nano/macro size, which comprises three-dimensionally interconnected open pores including nanopores having a size of 1~100 nm and macropores having a size of >100 μm, formed in a biodegradable polymer having a bioceramic material or biomaterial powder, in which calcium and phosphorus are uniformly dispersed in silicon, uniformly distributed therein, the nanopores being formed using a block copolymer of polyethylene oxide and polypropylene oxide as a template for inducing the formation of the nanopores, and the macropores being formed using a three-dimensional rapid prototyping machine.

In addition, the present invention provides porous material having hierarchical pore structure of a nano/semi-macro/macro size, which comprises three-dimensionally interconnected open pores including nanopores having a size of 1~100 nm, semi-macropores having a size of 0.1~100 μm, and macropores having a size of >100 μm, formed in a bioceramic material or biomaterial in which calcium and phosphorus are uniformly dispersed in silicon, the nanopores being formed using a block copolymer of polyethylene oxide and polypropylene oxide as a template for inducing the formation of the nanopores, the semi-macropores being formed using a template for inducing the formation of the semi-macropores, and the macropores being formed using a three-dimensional rapid prototyping machine.

Further, the present invention provides a method of preparing porous material having hierarchical pore structure of a nano/macro size, which comprises three-dimensionally interconnected open pores including nanopores and macropores, the method comprising dissolving a block copolymer of polyethylene oxide and polypropylene oxide in an organic solvent, including alcohol, thus synthesizing a block copolymer template solution (step 1); mixing a silicon compound, a calcium compound, and a phosphorus compound, thus synthesizing a bioceramic material or biomaterial solution (step 2); adding the bioceramic material or biomaterial solution to the block copolymer template solution, thus obtaining a precursor solution (step 3); drying and burning the precursor solution, thus obtaining a porous material (step 4); grinding and powdering the porous material to a nano size or a micro size (step 5); mixing the ground and powdered porous material with a biodegradable polymer, thus obtaining a paste (step 6); and placing the paste in a three-dimensional rapid prototyping machine, and extruding it, thus forming macropores (step 7).

In addition, the present invention provides a method of preparing porous material having hierarchical pore structure of a nano/semi-macro/macro size, which comprises three-dimensionally interconnected open pores including nanopores, semi-macropores, and macropores, the method comprising dissolving a block copolymer of polyethylene oxide and polypropylene oxide in an organic solvent, including alcohol, thus synthesizing a block copolymer template solution (step 1); mixing a silicon compound, a calcium compound, and a phosphorus compound, thus synthesizing a bioceramic material or biomaterial solution (step 2); adding the bioceramic material or biomaterial solution to the block copolymer template solution, thus obtaining a precursor solution (step 3); adding a template for inducing the formation of semi-macropores to the precursor solution, and mixing them, thus obtaining a paste (step 4); placing the paste in a three dimensional rapid prototyping machine, and extruding it, thus forming a gel having macropores (step 5); and drying and burning the gel obtained in the step 5, thus removing an organic residue and the template (step 6).

DESCRIPTION OF THE PREFERRED EMBODIMENTS

Figure 1:
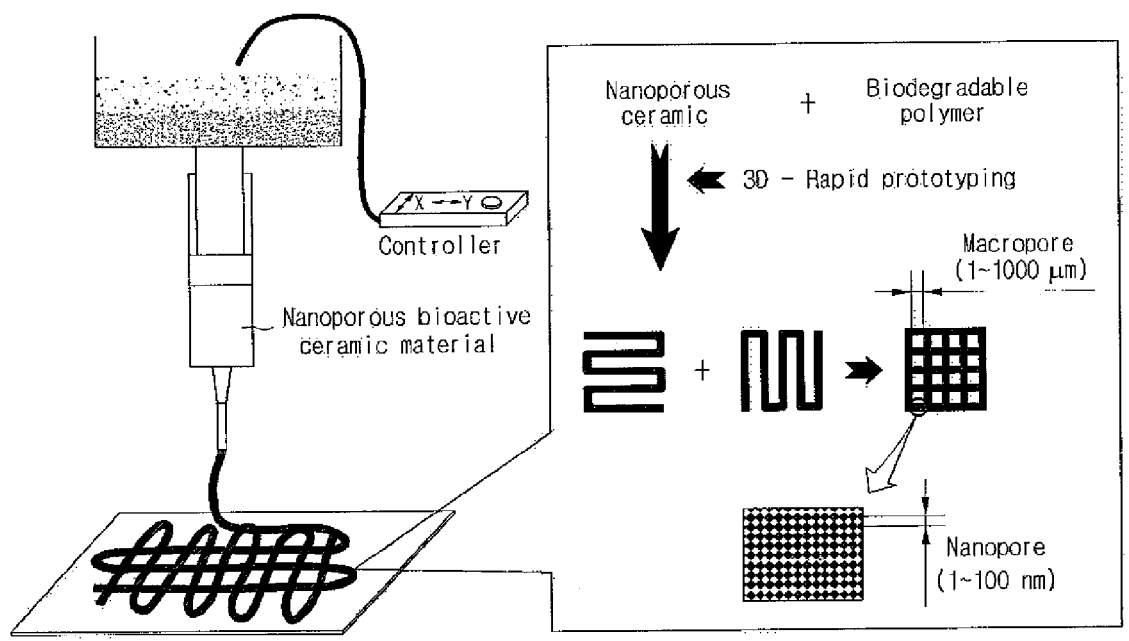
FIG. 1 illustrates a three-dimensional rapid prototyping technique for synthesizing a porous biomaterial having a double pore structure, according to a first embodiment of the present invention.

Hereinafter, a detailed description will be given of the present invention.

The present invention provides porous material having hierarchical pore structure of nano/macro size.

Specifically, the present invention provides porous material having hierarchical pore structure of nano/macro size, which comprises three-dimensionally interconnected open pores including nanopores having a size of 1~100 nm and macropores having a size of >100 μm, formed in a biodegradable polymer having a bioceramic material or biomaterial powder, in which calcium and phosphorus are uniformly dispersed in silicon, uniformly distributed therein, the nanopores being formed using a block copolymer of polyethylene oxide and polypropylene oxide as a template for inducing the formation of the nanopores, and the macropores being formed using a three-dimensional rapid prototyping machine.

The three-dimensionally interconnected open pore system is formed by an organic template constituting a self-organized structure, including the block copolymer, and gives a configuration in which open nanopores are interconnected while forming a regular structure, including a two-dimensional or three-dimensional, hexagonal or cubic structure. Further, the macropore structure of the porous ceramic material needs a configuration in which pores are connected in a three-dimensional direction (x-, y-, and z-axis directions), in order to serve as a scaffold for supporting cells The term "hierarchical pore structure" refers to a pore structure in which regular pores having size regions different from each other are interconnected, and which includes nanopores and macropores, respectively formed by the decomposition and removal of the block copolymer using a burning process or a solvent extraction process and by a three-dimensional rapid prototyping machine.

Examples of the bioceramic material include calcium phosphate-based oxide, such as apatite, or bioglass, and examples of the biomaterial include oxides, such as glass oxide, titania, zirconia, and alumina. Various porous materials may be obtained depending on the types of material used.

Examples of the biodegradable polymer include poly(ϵ-caprolactone) (PCL), polylactic acid (PLA), diol/diacid-based aliphatic polyester, and polyglycolic acid (PG), which may be applied as an artificial skin substitute material or a surgical suture agent. Among these, PCL is particularly useful. When the biodegradable polymer is grafted into a living body as material suitable for bone fracture treatment, which takes a long time, it is decomposed into lactic acid, which may then be harmlessly removed through metabolism.

In the present invention, the porous material having double pore structure of a nano/macro size may be prepared by dissolving a block copolymer of polyethylene oxide and polypropylene oxide in an organic solvent, including alcohol, thus synthesizing a block copolymer template solution (step 1); mixing a silicon compound, a calcium compound, and a phosphorus compound, thus synthesizing a bioceramic material or biomaterial solution (step 2); adding the bioceramic material or biomaterial solution to the block copolymer template solution, thus obtaining a precursor solution (step 3); drying and burning the precursor solution, thus obtaining a porous material (step 4); grinding and powdering the porous material to a nano size or a micro size (step 5); mixing the ground and powdered porous material with a biodegradable polymer, thus obtaining a paste (step 6); and placing the paste in a three-dimensional rapid prototyping machine and extruding it, thus forming macropores (step 7).

In the method of preparing the porous material having double pore structure according to the present invention, the step 1 is dissolving the block copolymer of polyethylene oxide and polypropylene oxide in the organic solvent, including alcohol, to thus synthesize the block copolymer template solution. As the block copolymer template, useful is a poloxamer having a structure of polyethylene oxide-polypropylene oxide-polyethylene oxide. The poloxamer is a pluronic or tetronic polymer having a hydrophilic group and a hydrophobic group. Among these, particularly useful is a block copolymer composed of a hydrophilic polymer block and a hydrophobic polymer block, including F127 ((polyethylene oxide)100(polypropylene oxide)65(polyethylene oxide)100, BASF), F108 ((polyethylene oxide)133(polypropylene oxide)50(polyethylene oxide)133, BASF), F98 ((polyethylene oxide)118(polypropylene oxide)44(polyethylene oxide)118, BASF), F88 ((polyethylene oxide)104(polypropylene oxide)39(polyethylene oxide)104, BASF), P123 ((polyethylene oxide)20(polypropylene oxide)70(polyethylene oxide)20, BASF), P105 ((polyethylene oxide)37(polypropylene oxide)56(polyethylene oxide)37, BASF), P104 ((polyethylene oxide)27(polypropylene oxide)61(polyethylene oxide)27, BASF) and pluronic, tetronic, reverse pluronic, or reverse tetronic copolymer having a ratio of polyethylene/polypropylene of 0.1~0.8. Depending on the type of block copolymer used in the present invention, the structure of the pore is determined. In the case of using F127, it is easy to form a three-dimensional cubic structure, and in the case where P123 is used as the template, it is easy to form a two-dimensional hexagonal structure.

Here, as the template for inducing the formation of the nanopores, in addition to the block copolymer, CTAB (cetyltrimethylammonium bromide), CTAC (cetyltrimethylammonium chloride), or surfactants having different carbon atoms, for example, $C_2$~$C_{40}$ dodecylammonium bromide, sodium dodecylsulfate, polydiallyldimethylammonium chloride, stearyl ammonium bromide, and stearylmethylammonium bromide, may be used.

The alcohol solvent preferably has a $C_1$~$C_{25}$ alkyl chain, but the present invention is not limited thereto. The block copolymer template is added in an amount of 10~80 mass %, based on the amount of ethanol used as the solvent, to synthesize the block copolymer template solution.

In the method of preparing the porous material having double pore structure according to the present invention, the step 2 is mixing the silicon compound, the calcium compound, and the phosphorus compound, to thus synthesize the bioceramic material or biomaterial solution. Using a process of mixing each starting solution at predetermined intervals or a process of adding an acidic or alkaline solution, calcium and phosphorus may be uniformly dispersed in silica. When calcium or phosphorus is uniformly dispersed in silica, crystallization, occurring during the mixing procedure, may be inhibited.

The silicon compound, the calcium compound, and the phosphorus compound may be mixed at an element ratio of Si:Ca:P of 50~80:18~45:2~10, and preferably 75Si:21Ca:4P, 65Si:31Ca:4P, or 55Si:4Ca:4P, thus synthesizing a bioglass solution. This is because the above range enables the formation of a stable cubic nanopore structure. In particular, it is preferred that the calcium compound be contained in an amount of 10~40 mass % based on the total amount of the silicon compound, the calcium compound, and the phosphorus compound. In this concentration range, the formation of the cubic nanopore structure is certain. Otherwise, when the concentration of the calcium compound exceeds 40 mass %, porosity is exhibited but the regular structure of the pores may be deteriorated.

In the present invention, examples of the silicon compound include tetraethylorthosilicate, 3-mercaptopropyltrimethoxysilane, and 5,6-epoxyhexyltriethoxysilane, examples of the calcium compound include calcium nitrate tetrahydrate, calcium nitrate, and calcium chloride, and examples of the phosphorus compound include triethylphosphate, sodium phosphate, and ammonium phosphate dibasic.

In the method of preparing the porous material having double pore structure according to the present invention, the step 3 is adding the bioceramic material or biomaterial solution to the block copolymer template solution, to thus obtain the precursor solution. Preferably, stirring the mixed solution at 700~1500 rpm (revolutions per minute) and 30~80° C. for 2~72 hours is also performed.

In the course of the mixing of the step 3 according to the present invention, the concentration of the block copolymer template is preferably 30~50 mass %. When the concentration of F127, serving as the block copolymer template, exceeds 30 mass % relative to the amount of TEOS (Tetraethyl orthosilicate), serving as the bioceramic material or biomaterial, an uneven surface becomes even and a regular nanopore structure having a long period is formed.

In the method of preparing the porous material having double pore structure according to the present invention, the step 4 is drying and burning the precursor solution to thus obtain the porous material. The drying is preferably conducted at −15~80° C. and 5~100 RH %. The solution is left to stand in a constant temperature and humidity chamber, satisfying the above temperature and humidity conditions, for 24~72 hours to dry it. The burning includes maintaining the dried product in the temperature range of 600~1000° C. at a heating rate of 0.2~2° C./min for 2~6 hours to realize a dense framework, and slowly cooling the product. Under the above burning conditions, it is easy to decompose and eliminate F127 or P123, used as the template.

In the method of preparing the porous material having double pore structure according to the present invention, the step 5 is grinding and powdering the porous material to a nano size or a micro size, for example, uniformly grinding and powdering the porous material through ball-milling to a nano size or a micro size, and preferably to a size of 50 μm or smaller.

In the method of preparing the porous material having double pore structure according to the present invention, the step 6 is mixing the ground and powdered porous material with the biodegradable polymer, to thus obtain the paste. The biodegradable polymer is preferably mixed with the porous ceramic material at a ratio of 50~80:50~20 mass %.

In the method of preparing the porous material having double pore structure according to the present invention, the step 7 is placing the paste in a three-dimensional rapid prototyping machine and extruding it, thus forming macropores. When the nozzle diameter and the x-, y-, and z-axis directions of the three-dimensional rapid prototyping machine are controlled and the paste extrusion speed is controlled, a two dimensional or three-dimensional configuration may be readily designed. As such, in order to retain this configuration, the curing may be facilitated through the application of heat at a moderate temperature to the substrate if needed.

In addition, the present invention provides porous material having hierarchical pore structure of a nano/semi-macro/macro size.

Specifically, the present invention provides porous material having hierarchical pore structure of a nano/semi-macro/macro size, which comprises three-dimensionally interconnected open pores including nanopores having a size of 1~100 nm, semi-macropores having a size of 0.1~100 μm, and macropores having a size of >100 μm, formed in a bioceramic material or biomaterial in which calcium and phosphorus are uniformly dispersed in silicon, the nanopores being formed using a block copolymer of polyethylene oxide and polypropylene oxide as a template for inducing the formation of the nanopores, and the semi-macropores being formed using a template for inducing the formation of the semi-macropores, the macropores being formed using a three-dimensional rapid prototyping machine.

Examples of the bioceramic material include calcium phosphate-based oxide, such as apatite, or bioglass, and examples of the biomaterial include oxides, such as glass oxide, titania, zirconia, and alumina. Various porous materials may be obtained depending on the type of material used.

Examples of the template for inducing the formation of the semi-macropores include giant polymers, such as methylcellulose, polystyrene, and poly(N-isopropylacrylamide) (PNIPAM). Among these, the use of methylcellulose is preferable. This is because methylcellulose has superior biostability and is thus suitable for use as a biomaterial.

In the present invention, the porous material having hierarchical pore structure of a nano/semi-macro/macro size may be prepared by dissolving a block copolymer of polyethylene oxide and polypropylene oxide in an organic solvent, including alcohol, thus synthesizing a block copolymer template solution (step 1); mixing a silicon compound, a calcium compound, and a phosphorus compound, thus synthesizing a bioceramic material or biomaterial solution (step 2); adding the bioceramic material or biomaterial solution to the block copolymer template solution, thus obtaining a precursor solution (step 3); adding a template for inducing the formation of semi-macropores to the precursor solution and mixing them, thus obtaining a paste (step 4); placing the paste in a three-dimensional rapid prototyping machine and extruding it, thus obtaining a gel having macropores (step 5); and drying and burning the gel obtained in step 5, thus removing the organic residue and the template (step 6).

In the method of preparing the porous material having triple pore structure according to the present invention, the step 1 is dissolving the block copolymer of polyethylene oxide and polypropylene oxide in the organic solvent, including alcohol, to thus synthesize the block copolymer template solution. As the block copolymer template, a poloxamer having a structure of polyethylene oxide-polypropylene oxide-polyethylene oxide may be used. Such a poloxamer is a pluronic or tetronic polymer having a hydrophilic group and a hydrophobic group. Among these, particularly useful is a block copolymer composed of a hydrophilic polymer block and a hydrophobic polymer block, including F127, F108, F98, F88, P123, P105, P104 and pluronic, tetronic, reverse pluronic or reverse tetronic copolymer having a ratio of polyethylene/polypropylene of 0.1~0.8. Depending on the type of block copolymer used in the present invention, the structure of the pore is determined. In the case where F127 is used, it is easy to form a three-dimensional cubic structure, and in the case where P123 is used as the template, it is easy to form a two-dimensional hexagonal structure.

Here, as the template for inducing the formation of the nanopores, in addition to the block copolymer, CTAB, CTAC, or surfactants having different carbon atoms, for example, $C_2$~$C_{40}$ dodecylammonium bromide, sodium dodecylsulfate, polydiallyldimethylammonium chloride, stearyl ammonium bromide, and stearylmethylammonium bromide, may be used.

The alcohol solvent preferably has a $C_1$~$C_{25}$ alkyl chain, but the present invention is not limited thereto. The block copolymer template is added in an amount of 10~80 mass % based on the amount of ethanol, which is used as the solvent, to synthesize the block copolymer template solution.

In the method of preparing the porous material having triple pore structure according to the present invention, the step 2 is mixing the silicon compound, the calcium compound, and the phosphorus compound, to thus synthesize the bioceramic material or biomaterial solution. Calcium and phosphorus may be uniformly dispersed in silica using a process of mixing each starting solution at predetermined intervals or a process of adding an acidic or alkaline solution. When calcium or phosphorus is uniformly dispersed in silica, crystallization can be prevented from occurring during the mixing procedure.

The silicon compound, the calcium compound, and the phosphorus compound may be mixed at an element ratio of Si:Ca:P of 50~80:18~45:2~10, and preferably 75Si:21Ca:4P, 65Si:31Ca:4P, or 55Si:4Ca:4P, thus synthesizing a bioglass solution. This is because the above range enables the formation of a stable cubic nanopore structure. In particular, it is preferred that the calcium compound be contained in an amount of 10~40 mass % based on the total amount of the silicon compound, the calcium compound, and the phosphorus compound. The formation of the cubic nanopore structure is certain in the above concentration range. Otherwise, when the concentration of the calcium compound exceeds 40 mass %, porosity is exhibited but the regular structure of the pores may be deteriorated.

In the present invention, examples of the silicon compound include tetraethylorthosilicate, 3-mercaptopropyltrimethoxysilane, and 5,6-epoxyhexyltriethoxysilane, examples of the calcium compound include calcium nitrate tetrahydrate, calcium nitrate, and calcium chloride, and examples of the phosphorus compound include triethylphosphate, sodium phosphate, and ammonium phosphate dibasic.

In the method of preparing the porous material having triple pore structure according to the present invention, the step 3 is adding the bioceramic material or biomaterial solution to the block copolymer template solution, to thus obtain the precursor solution. Preferably, stirring the mixed solution at 700~1500 rpm and 30~80° C. for 2~72 hours is included.

In the course of the mixing of the step 3 according to the present invention, the concentration of the block copolymer template is preferably set to be 30~50 mass %. When F127, serving as the block copolymer template, has a concentration exceeding 30 mass % relative to TEOS, serving as the bioglass material, an uneven surface becomes even and a regular nanopore structure having a long period is formed.

In the method of preparing the porous material having triple pore structure according to the present invention, the step 4 is adding the template for inducing the formation of the semi-macropores to the precursor solution, and mixing them, thus obtaining the paste. Examples of the template for inducing the formation of the semi-macropores include giant polymers, such as methylcellulose, polystyrene, or PNIPAM. Among these, particularly useful is methylcellulose. The methylcellulose functions as a binder for adjusting the viscosity of the precursor solution to thus enable the preparation of macropores through a three-dimensional rapid prototyping technique, and is also suitable for use as biomaterial thanks to the superior biostability thereof.

Methylcellulose, having a 2% aqueous solution viscosity of 15~4000 cps, is added in an amount of 0.01~20 mass % based on the precursor solution, thus obtaining a precursor/methylcellulose paste. Preferably, methylcellulose having a molecular weight of 17000~86000 is used, and this molecular weight has an influence on the porosity and macropore size of the resultant porous material.

In the course of mixing the paste through sonication, the viscosity of the paste may be adjusted. When the paste has a viscosity suitable for maintaining a predetermined configuration, the subsequent step may be conducted. In this case, the preferred viscosity of the paste is 500~2000 cps.

In the method of preparing the porous material having triple pore structure according to the present invention, the step 5 is placing the paste in the three-dimensional rapid prototyping machine and extruding it, thus forming the gel having macropores. When the extrusion diameter and the x-, y-, and z-axis directions of the three-dimensional rapid prototyping machine are controlled and the paste extrusion speed is controlled, a two-dimensional or three-dimensional configuration may be readily designed. In order to retain this configuration, the curing may be facilitated through the application of heat at a moderate temperature to the substrate if needed.

In the method of preparing the porous material having triple pore structure according to the present invention, the step 6 is drying and burning the gel obtained in the step 5 to thus remove the organic residue and the above template. The drying is preferably conducted at −15~80° C. and 5~100 RH %. The solution is left to stand in a constant temperature and humidity chamber, satisfying the above temperature and humidity conditions, for 24~72 hours to dry it.

The burning includes maintaining the dried product in the temperature range of 600~1000° C. at a heating rate of 0.2~2° C./min for 2~6 hours to realize a dense framework, and slowly cooling the product. Under the above burning conditions, used as the template, F127 or P123 and methylcellulose may be easily decomposed and eliminated.

Figure 2:
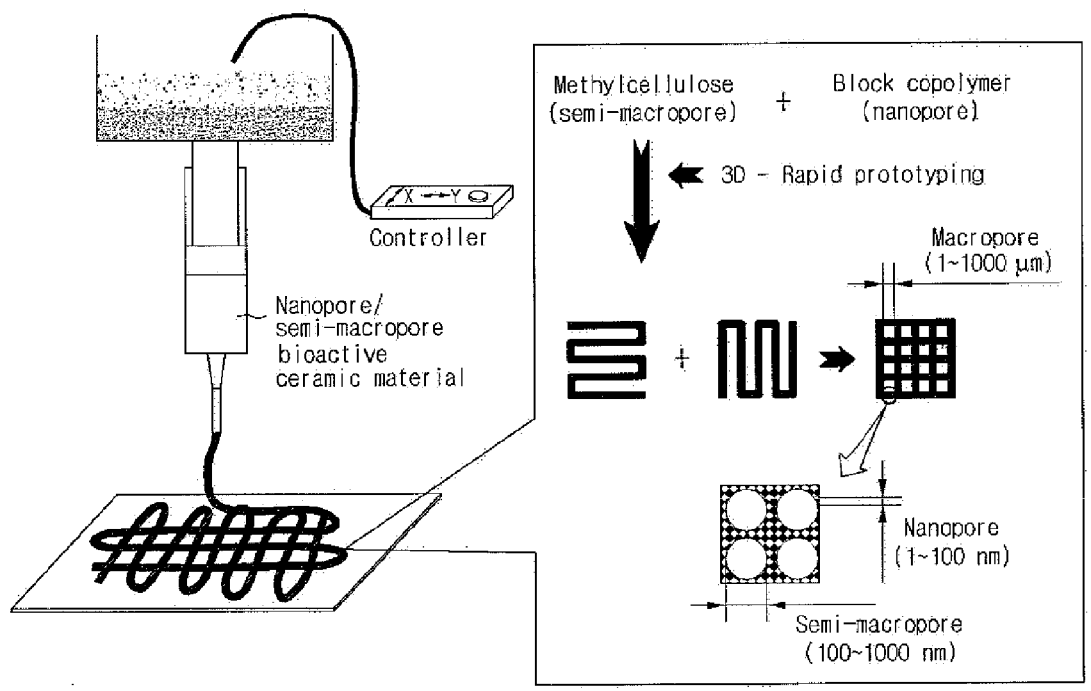
FIG. 2 illustrates a three-dimensional rapid prototyping technique for synthesizing a porous biomaterial having a triple pore structure, according to a second embodiment of the present invention.

The synthesis method of the present invention is schematically illustrated in FIGS. 1 and 2.

Figure 3:
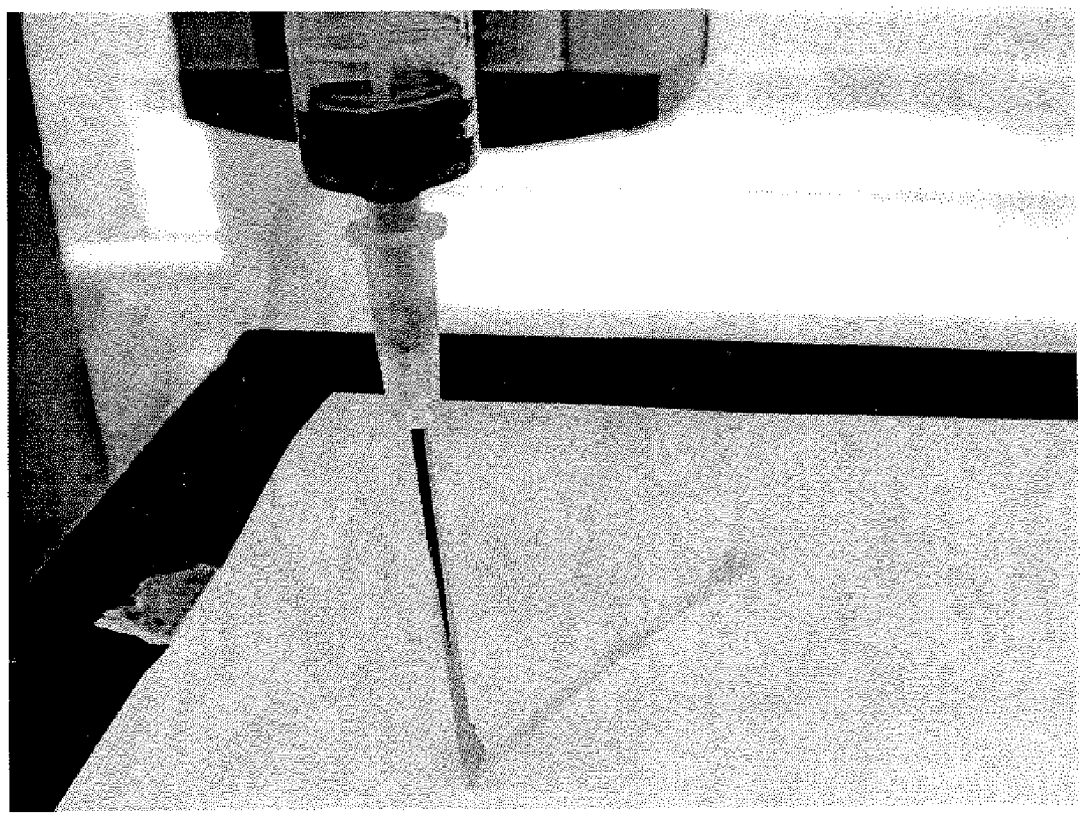
FIG. 3 illustrates a process of extruding a paste using a three-dimensional rapid prototyping technique to form a hierarchical pore structure according to the present invention.

In the method according to a first embodiment of the present invention, nanoporous ceramic powder having nanopores is prepared and is then mixed with the biodegradable polymer, after which the formation of macropores is induced using a three-dimensional rapid prototyping technique (FIG. 3). In this case, a porous organic-inorganic composite material having a double pore structure may be obtained (FIG. 1). In addition, in the method according to a second embodiment of the present invention, methylcellulose for inducing the formation of semi-macropores is added in the course of synthesizing nanoporous ceramic to thus increase the viscosity thereof, after which the formation of macropores is induced using a three-dimensional rapid prototyping technique, and then both the template for inducing the nanopores and methylcellulose are burned, thereby obtaining a single-phase porous material having triple pore structure (FIG. 2).

A better understanding of the present invention may be obtained in light of the following examples, which are set forth to illustrate, but are not to be construed to limit the present invention.

EXAMPLE 1

Preparation of Porous Organic-Inorganic Composite Material having Double Pore Structure Pluronic F127 ((polyethylene oxide)100(polypropylene oxide)65(polyethylene oxide)100) for inducing the formation of a three-dimensional cubic nanopore structure, and pluronic P123 ((polyethylene oxide)20(polypropylene oxide)70(polyethylene oxide)20) for inducing the formation of a hexagonal nanopore structure were used as a block copolymer template. First, F127 (2.88 g) was added to ethanol (18.1 ml) and then stirred at 40° C. for 0.5~1 hours until completely dissolved (solution A). Separately, as a bioceramic material or biomaterial, tetraethylorthosilicate (TEOS, 6 ml) and calcium nitrate tetrahydrate (1.36 g) were slowly mixed until uniform, and then triethylphosphate (0.26 ml) was added thereto. Thereafter, this solution was added with a previously prepared mixture of 1 M hydrochloric acid solution (0.95 ml), ethanol (7.62 ml), and distilled water (2.86 ml) and then stirred at 40° C. for 0.5~1 hours until the inorganic starting material was uniformly dissolved (solution B). The solution B was slowly added to the solution A with vigorous stirring at a speed of 700~1500 rpm at 40° C. for 2~4 hours.

A predetermined amount of the obtained precursor solution was placed in a hydrophobic vessel (e.g., a polystyrene vessel), and left to stand in a constant temperature and humidity chamber at −15~80° C. and 5~100 RH % for 24~72 hours to thus evaporate and dry the solution. In the case where the precursor solution was applied on a predetermined substrate, a thin film type porous material could be obtained. The precursor solution was burned at 500~1000° C. for 4 hours through heating at a rate of 1° C./min, thus removing F127 used as the template, consequently obtaining porous material having three-dimensional regular structure of nanopores.

The porous material was subjected to ball-milling to thus be uniformly ground and powdered to a nano size or a micro size of 50 μm or smaller, after which the resultant powder (1 g) was uniformly dispersed in chloroform (10 ml) and then mixed with a biodegradable polymer PCL (1 g) at an appropriate temperature until a uniform paste was obtained. The nanoporous bioceramic material or biomaterial/PCL paste was placed in a three-dimensional rapid prototyping machine, and then the x-, y-, and z-axis intervals and shapes were controlled, thus preparing macropores having a desired size and configuration. In order to retain this configuration, the curing of the paste was facilitated through the application of heat at a moderate temperature to the substrate, or using a vessel containing alcohol, if needed. The results of analysis of the obtained porous organic-inorganic composite material having a double pore structure are shown in FIGS. 4 to 8.

Figure 4:
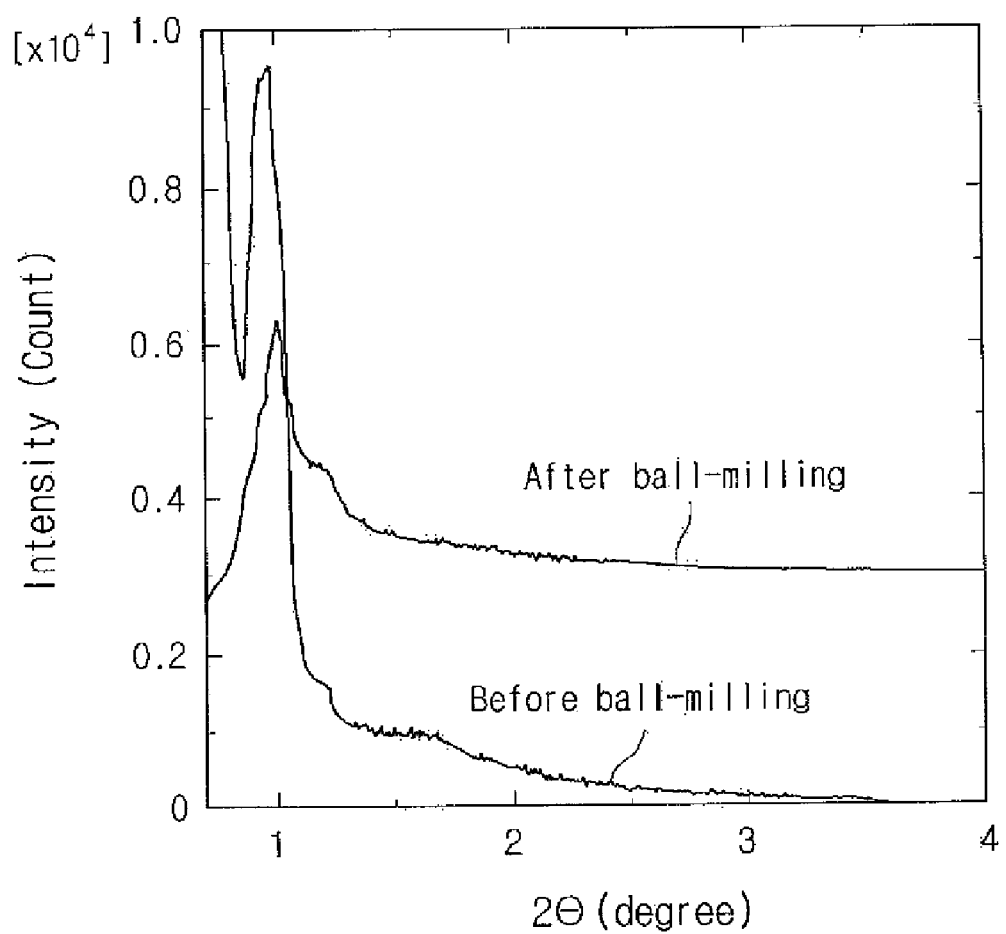
FIG. 4 illustrates the results of measurement of X-ray diffraction (XRD) showing whether the pore structure of the ground (ball-milled) nanoporous material is maintained, according to the present invention.
Figure 5:
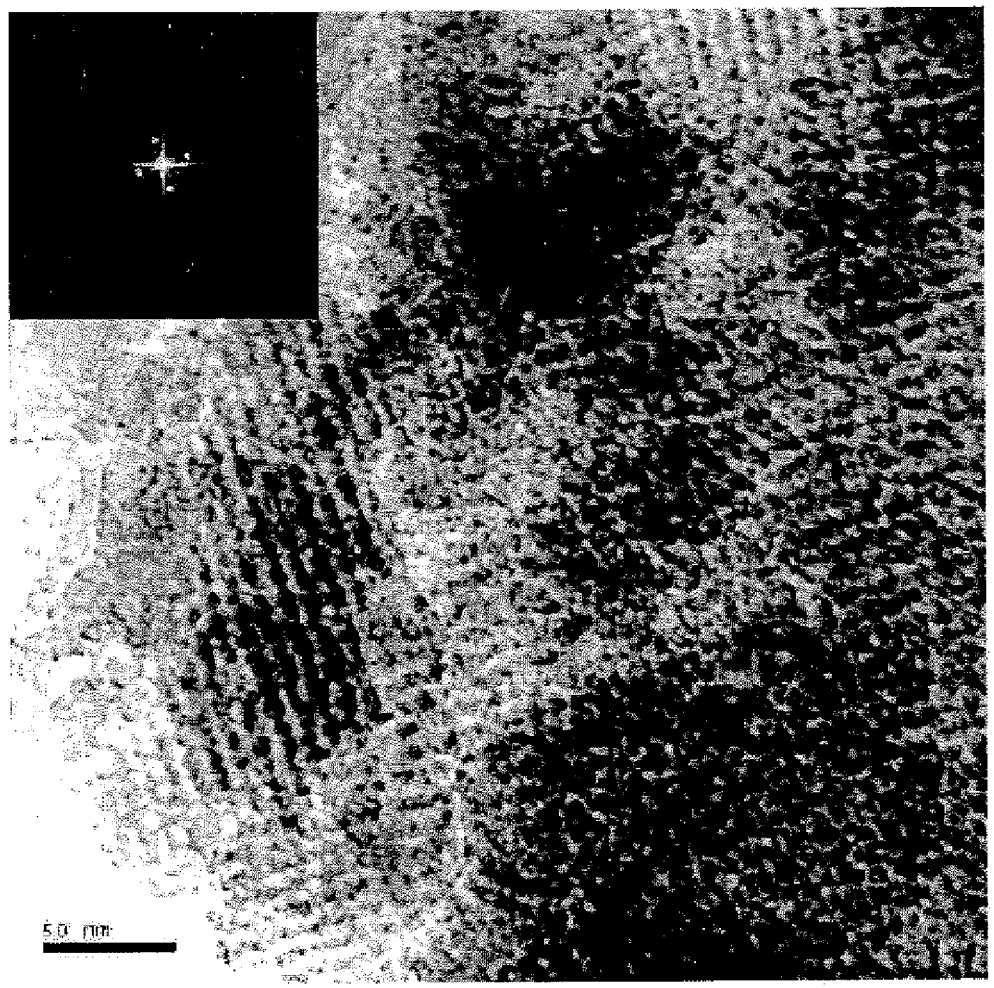
FIG. 5 illustrates a transmission electron micrograph (TEM) showing whether the pore structure of the ground nanoporous material is maintained, according to the present invention.

FIG. 4 is a graph illustrating the results of measurement of X-ray diffraction (XRD) showing whether the nanopore structure of the porous material, which is obtained using the block copolymer, uniformly distributed in the biodegradable polymer, and ground through ball-milling to prevent the clogging when extruded from the nozzle of the three-dimensional rapid prototyping machine, is maintained. From the XRD results, the porous material can be seen to maintain the regular cubic nanopore structure thereof even after the powder is ground to a submicro size through ball-milling. Further, the transmission electron micrograph (TEM) of FIG. 5 confirms the formation of the cubic pore structure in about 100~200 nm sized particles.

Figure 6:
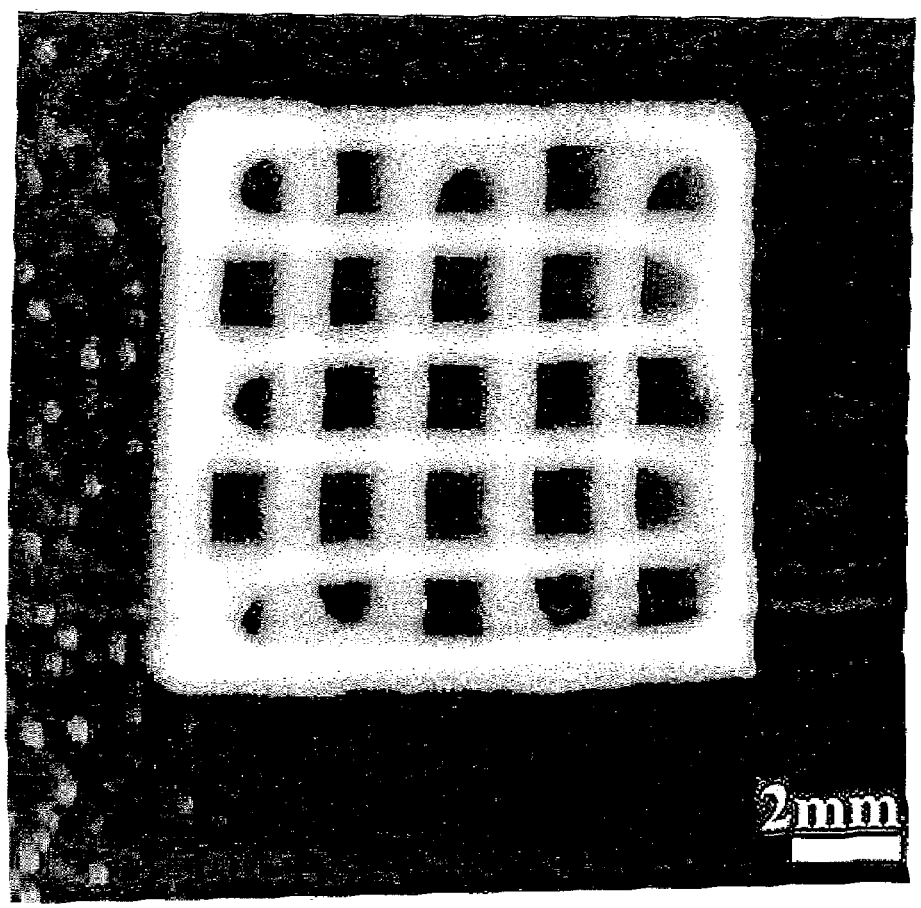
FIG. 6 illustrates the macropores of the porous material having double pore structure, formed according to the first embodiment of the present invention.

As shown in FIG. 6, to form a predetermined configuration using a three-dimensional rapid prototyping machine, the paste obtained by mixing the above powder with the biodegradable polymer may be designed to have a two-dimensional or three-dimensional configuration through the control of the dimension and direction of x-, y-, and z-axis and of the paste extrusion speed using the process as in FIG. 3. FIG. 6 illustrates the results obtained by extruding the paste while repeatedly moving along x, y, and z axes in the same pattern having a certain size so as to provide pores at intervals of about 1 mm. The results of observation of the material of FIG. 6 using an optical microscope and a scanning electron microscope are illustrated in FIGS. 7 and 8.

Figure 7:
FIG. 7 illustrates an optical micrograph of the porous material having double pore structure, according to the first embodiment of the present invention.
Figure 7:
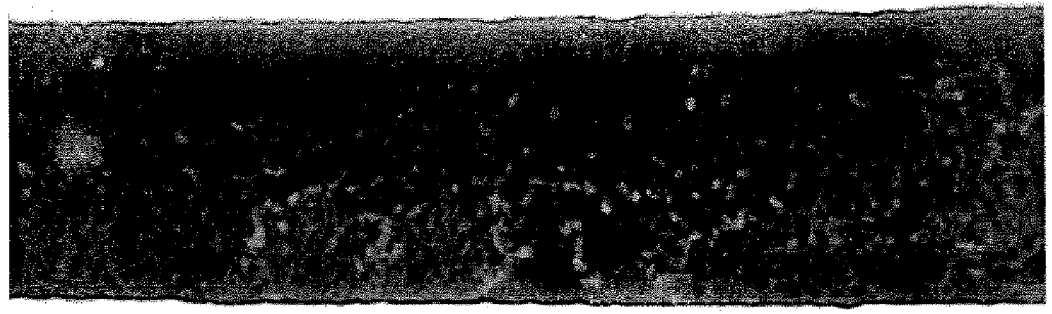
Figure 7:
Figure 8:
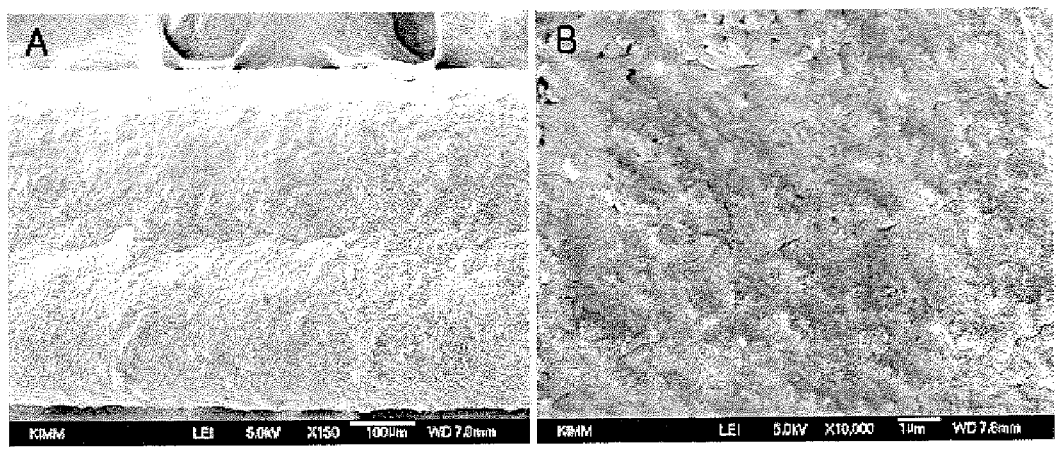
FIG. 8 illustrates a scanning electron micrograph (SEM) of the porous material having double pore structure, according to the first embodiment of the present invention.

As illustrated in FIGS. 7 and 8, the porous powder is uniformly distributed in the biodegradable polymer (here, PCL), which is considered to be important to ensure the uniform adhesion of cells when the obtained porous material is used as a scaffold for supporting cells. The thickness of the porous material may be controlled by the size of the nozzle, and the pore size may be controlled by adjusting the x-, y- and z-axis intervals.

EXAMPLE 2

Preparation of Porous Bioglass having Triple Pore Structure

Pluronic F127 ((polyethylene oxide)100(polypropylene oxide)65(polyethylene oxide)100) for inducing the formation of a three-dimensional cubic nanopore structure, and pluronic P123 ((polyethylene oxide)20(polypropylene oxide)70(polyethylene oxide)20) for inducing the formation of a hexagonal nanopore structure were used as a block copolymer template. First, F127 (2.88 g) was added to ethanol (18.1 ml) and then stirred at 40° C. for 0.5~1 hours until completely dissolved (solution A). Separately, as bioglass material, TEOS (6 ml) and calcium nitrate tetrahydrate (1.36 g) were slowly mixed until uniform, and then triethylphosphate (0.26 ml) was added thereto. Then, this solution was added with a previously prepared mixture of 1 M hydrochloric acid solution (0.95 ml), ethanol (7.62 ml), and distilled water (2.86 ml), and then stirred at 40° C. for 0.5~1 hours until the inorganic starting material was uniformly dissolved (solution B). The solution B was slowly added to the solution A with vigorous stirring at a speed of 700~1500 rpm at 40° C. for 2~4 hours.

The obtained precursor solution (10 ml) was mixed with methylcellulose (1 g), after which sonication was conducted if needed. When the viscosity of the precursor solution was increased and reached a value able to maintain a predetermined configuration, the precursor solution was placed in the paste extrusion nozzle of a three-dimensional rapid prototyping machine, and then the x-, y-, and z-axis intervals and shapes were controlled, thus preparing macropores having a desired size and configuration. The three-dimensional structure material in a gel phase was left to stand in a constant temperature and humidity chamber at $-15\sim80°$ C. and 5~100 RH % for 24~72 hours to thus evaporate and dry the solution. After the drying process, the dried product was burned in the temperature range of 600~1000° C. at a rate of 0.5° C./min for 4 hours, and thus both the two polymers, used as the template, were decomposed and removed. The results of analysis of the obtained porous bioglass having a triple pore structure are illustrated in FIGS. 9, 10 and 11.

Figure 9:
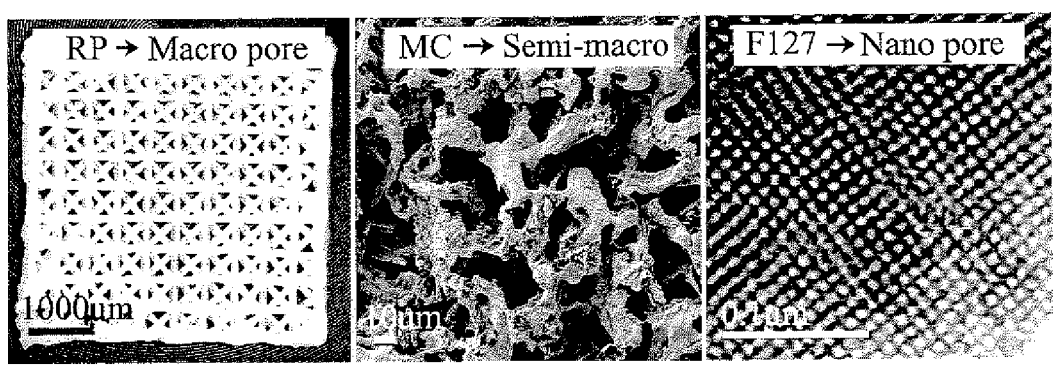
FIG. 9 illustrates an optical micrograph (left), an SEM (middle), and a TEM (right) of the porous material having triple pore structure, according to the second embodiment of the present invention.

From the optical micrograph (left) of FIG. 9, it can be seen that, before the burning process, three-dimensional macropores are formed through a three-dimensional rapid prototyping technique using the paste obtained by mixing the precursor solution with methylcellulose, and the configuration thereof is maintained even after the burning process. Further, from the scanning electron micrograph (middle) of part of the pores, the inorganic (bioglass) frame defining the macropores is seen to be formed of interconnected semi-macropores having a size of 0.1~100 μm, resulting from the removal of methylcellulose. Furthermore, from the transmission electron micrograph (right) of part of the pores, the inorganic frame defining the semi-macropores is seen to be formed of nanopores having a regular structure, resulting from the removal of the block copolymer.

Figure 10:
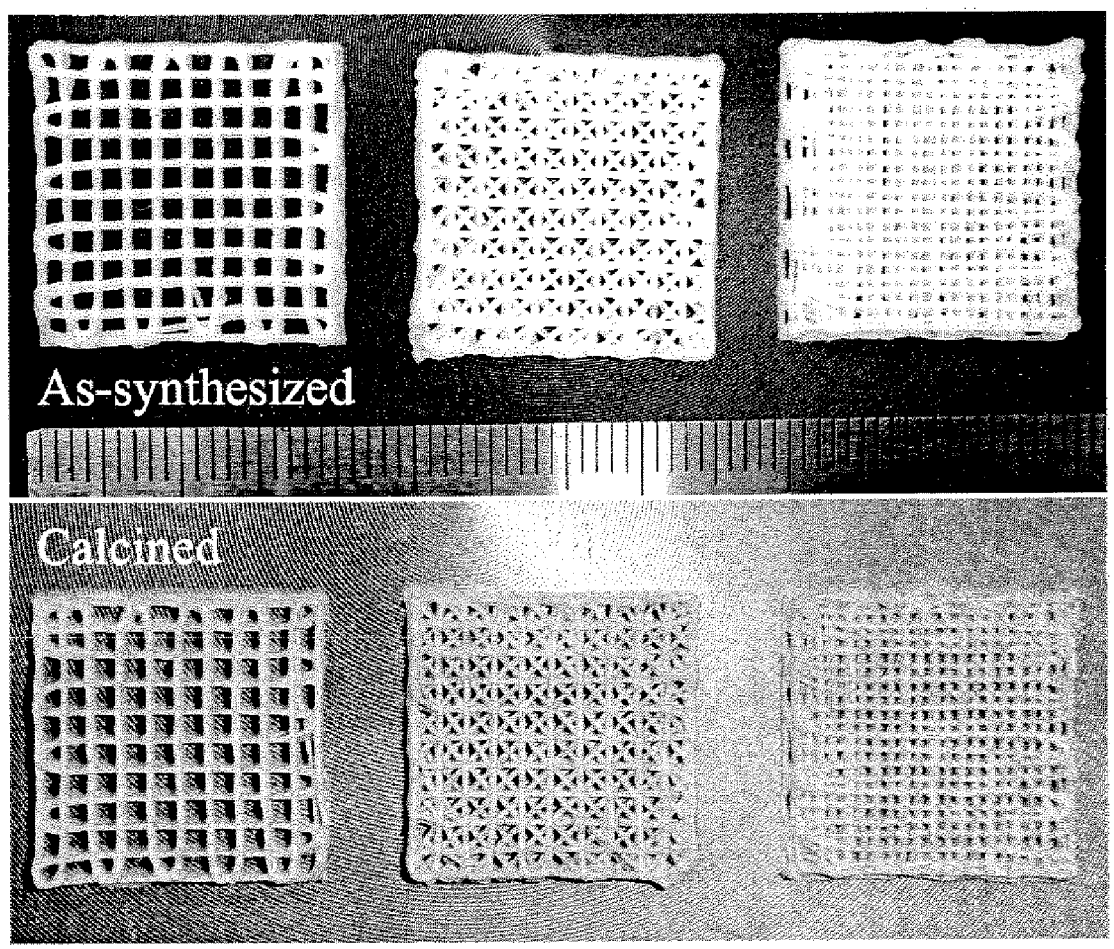
FIG. 10 illustrates the optical micrographs of the porous material having triple pore structure prepared using a three-dimensional rapid prototyping technique to have a macro structure, designed by computer simulation, before and after calcination.

As illustrated in FIG. 10, the designed macropore structure may be controlled to have various configurations sizes, and thicknesses. As synthesized, the macropore structure is seen to be maintained without deformation, including cracking, even after the burning process.

Figure 11:
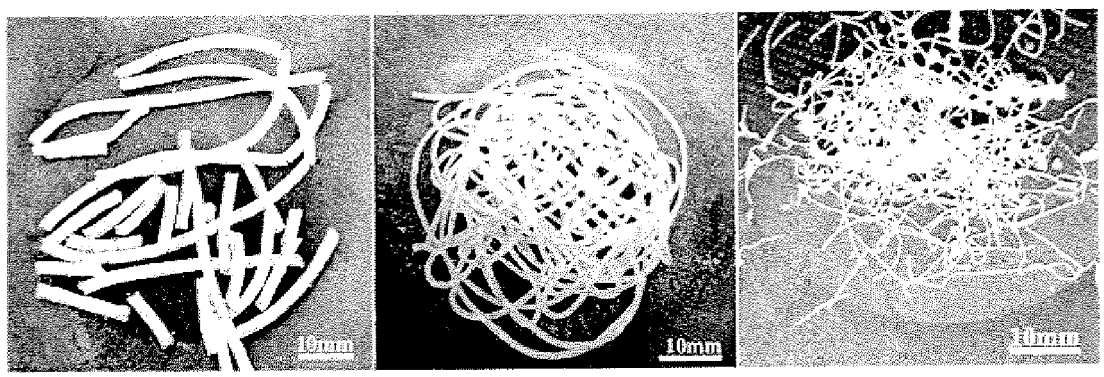
FIG. 11 illustrates the porous material having triple pore structure, the thickness of which may be easily controlled depending on a nozzle diameter using a three-dimensional rapid prototyping technique.

As illustrated in FIG. 11, the porous material may be formed to have various thicknesses using a three-dimensional rapid prototyping technique. The size of the inorganic frame thereof may be controlled by adjusting the diameter of the nozzle.

EXAMPLE 3

Preparation of Porous Glass having Triple Pore Structure

Pluronic F127 ((polyethylene oxide)100(polypropylene oxide)65(polyethylene oxide)100) for inducing the formation of a three-dimensional cubic nanopore structure, and pluronic P123 ((polyethylene oxide)20(polypropylene oxide)70(polyethylene oxide)20) for inducing the formation of a hexagonal nanopore structure were used as a block copolymer template. First, F127 (2.88 g) was added to ethanol (18.1 ml) and then stirred at 40° C. for 0.5~1 hours until completely dissolved (solution A). Separately, as a glass material, TEOS (6 ml) was added to a previously prepared mixture of 1 M hydrochloric acid solution (0.95 ml), ethanol (7.62 ml), and distilled water (2.86 ml), and then stirred at 40° C. for 0.5~1 hours until TEOS was uniformly dissolved (solution B). The solution B was slowly added to the solution A with vigorous stirring at a speed of 700~1500 rpm at 40° C. for 2~4 hours.

The obtained precursor solution (10 ml) was mixed with methylcellulose (1 g), after which sonication was conducted if needed. When the viscosity of the precursor solution was increased and reached a value able to maintain a predetermined configuration, the precursor solution was placed in the paste nozzle of a three-dimensional rapid prototyping machine, and the x-, y- and z-axis intervals and shapes were controlled, thus preparing macropores having a desired size and configuration. The three-dimensional structure material in a gel phase was left to stand in a constant temperature and humidity chamber at −15~80° C. and 5~100 RH % for 24~72 hours to thus evaporate and dry the solution. After the drying process, the dried product was burned in the temperature range of 600~1000° C. at a rate of 0.5° C./min for 4 hours, and thus both the two polymers used as the template were decomposed and removed. The results of analysis of the obtained porous glass having a triple pore structure are illustrated in FIG. 12.

Figure 12:
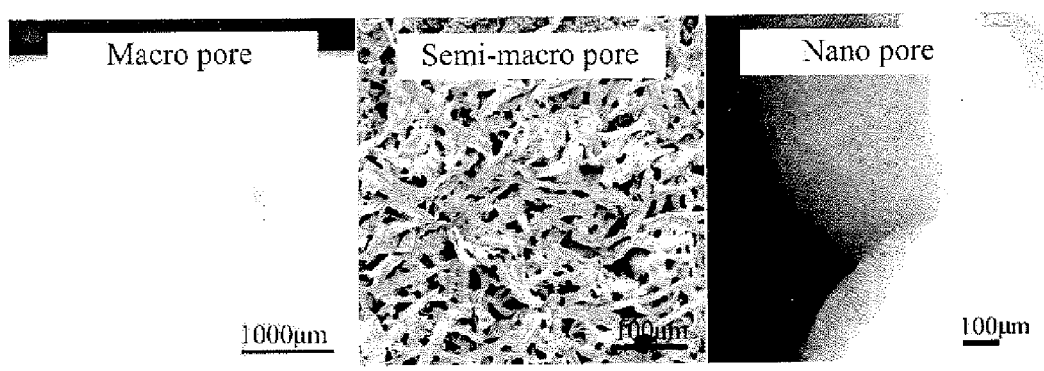
FIG. 12 illustrates an optical micrograph (left), an SEM (middle), and a TEM (right) of the porous glass material having a triple pore structure, according to the second embodiment of the present invention.

From the optical micrograph (left) of FIG. 12, it can be seen that, before the burning process, three-dimensional macropores are formed through a three-dimensional rapid prototyping technique using the paste obtained by mixing the precursor solution with methylcellulose. Further, from the scanning electron micrograph (middle) of part of the pores, the inorganic (glass) frame defining the macropores is seen to be formed of interconnected semi-macropores having a size of 10~15 μm, resulting from the removal of methylcellulose. Furthermore, from the transmission electron micrograph (right) of part of the pores, the inorganic frame defining the semi-macropores is seen to be formed of nanopores having a regular structure, resulting from the removal of the block copolymer.

According to the present invention, using a combined technique of block copolymer-methylcellulose-three-dimensional rapid prototyping, orous material having hierarchical pore structure including interconnected nanopores, semi-macropores, and macropores may be obtained. As such, the pore structure, pore size, inorganic frame thickness, and porosity of respective pores may vary depending on the types and synthesis conditions of the polymer template and conditions for a three-dimensional rapid prototyping technique. In addition, before the burning process, because methylcellulose is mixed with the precursor solution in a uniform phase, synthesized through a sol-gel method, nanopores and macropores may be uniformly distributed. Moreover, a predetermined configuration is formed using a three-dimensional rapid prototyping technique, and then the burning process is conducted, thereby making it possible to control the configuration without the addition of the biodegradable polymer, or without the ball-milling process, as in the synthesis method of Example 1. Therefore, using the synthesis method of the present invention, a three-dimensional porous material having three kinds of pores may be obtained.

Experimental Example 1

Evaluation of Bioactivity of Porous Material having Hierarchical Pore Structure

To evaluate the bioactivity of the porous material of the present invention in vitro, the following experiment was conducted. The porous material obtained in the example was immersed in 200 mM calcium chloride ($CaCl_2$, 300 ml) for 10 sec, and was then washed with excess water. Subsequently, the material was immersed in 200 mM potassium phosphate dibasic trihydrate ($K_2HPO_4 \cdot 3H_2O$) and was then washed with excess water. This washing process was repeated three times. The washed porous material was dried, and then cultured in SBF (simulated body fluid) containing 142.0 mM $Na^+$, 5 mM $K^+$, 1.5 mM $Mg^{2+}$, 2.5 mM $Ca^{2+}$, 147.8 mM $Cl^-$, 4.2 mM $HCO_3^-$, 1.0 mM $HPO_4^{2-}$ and 0.5 mM $SO_4^{2-}$. The SBF solution was composed of chemical components similar to the body fluid, the pH thereof was set to be 7.4, and the temperature thereof was maintained at 37° C. The results of bioactivity after culture are illustrated in FIGS. 13 and 14.

Figure 13:
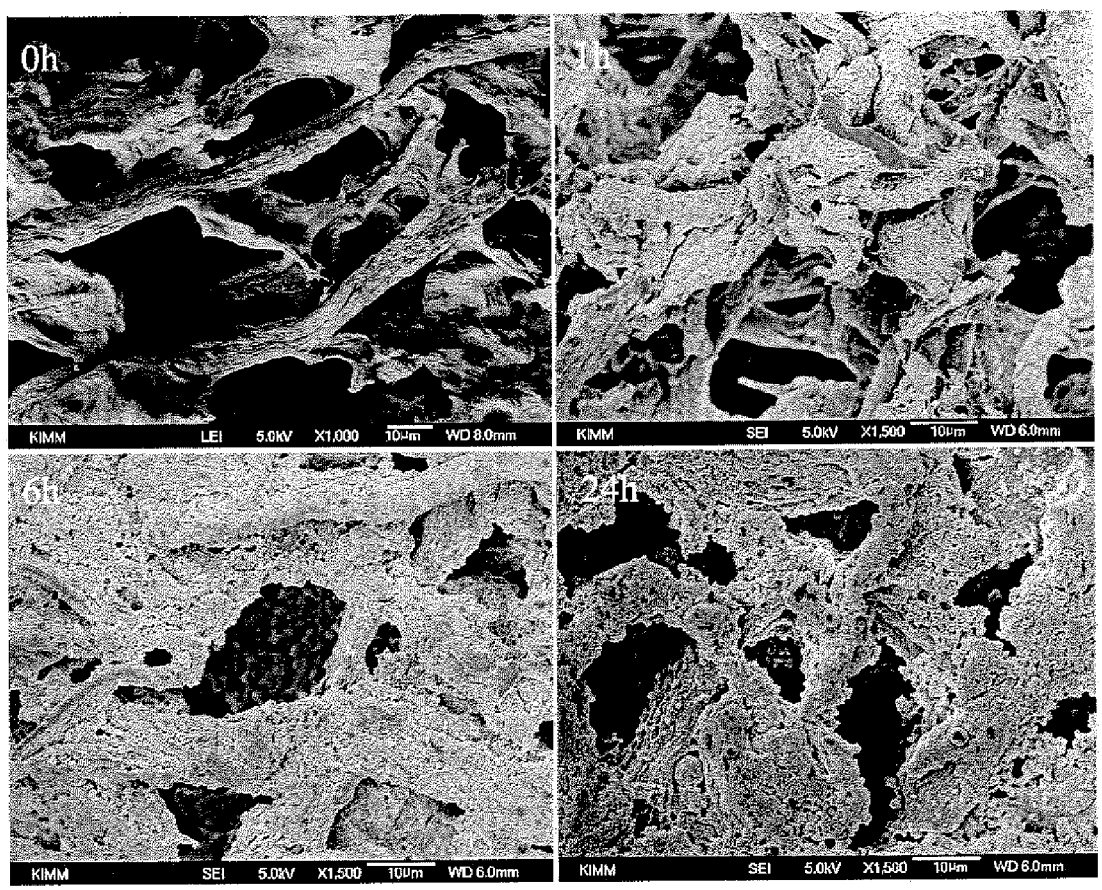
FIG. 13 illustrates the results of an experiment on bioactivity of the porous material having triple pore structure in a simulated body fluid in vitro.

As illustrated in FIG. 13, the triple porous material obtained in the present invention is seen to exhibit bioactivity, indicating the uniform production of calcium phosphate-based material on the ceramic surface through immersion in the SBF, and also to increase the amount of the calcium phosphate-based material over time. Generally, bioglass is known to require a time period of two or three days to be uniformly coated with calcium phosphate-based material after being immersed in SBF. However, the triple porous material of the present invention is confirmed to uniformly produce calcium phosphate-based material even after immersion in the SBF for only 1 hour, thereby realizing very rapid bioactivity. This is supposed to be because the specific surface area of the porous material is greatly increased thanks to the nanopores formed therein, and thus the contact area with the SBF is enlarged to thereby result in rapid bone forming activity. The produced calcium phosphate-based material is confirmed to have a submicro size (average 100~200 nm), which is similar to the size of calcium phosphate-based material in the human body. Thereby, the porous material of the present invention is effective in inducing more rapid formation, growth and differentiation of bone cells.

Figure 14:
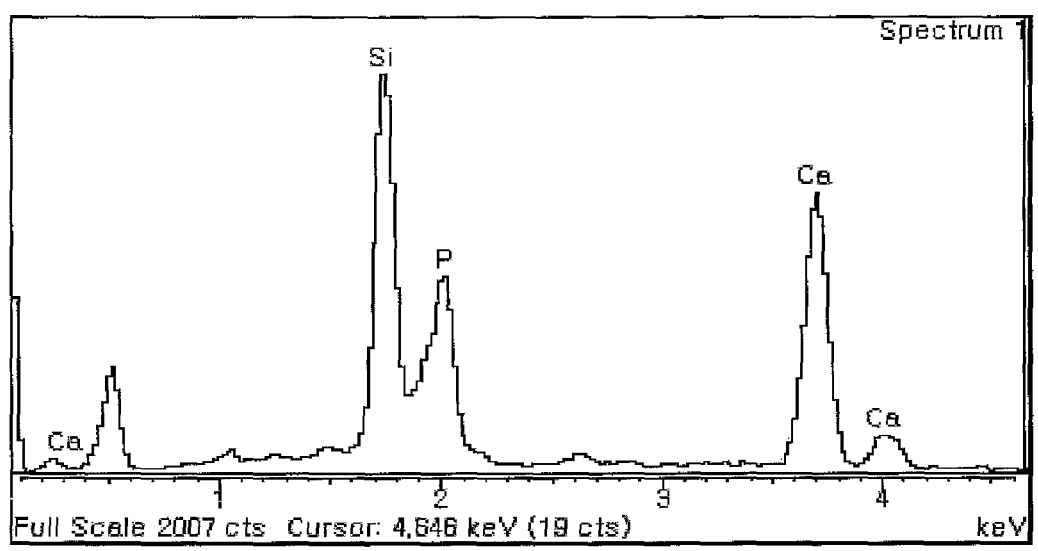
FIG. 14 illustrates the results of energy dispersive x-ray spectroscopy (EPX) after immersion of the porous material having triple pore structure in a simulated body fluid for 24 hours.

Further, as is apparent from the results of EDX of FIG. 14, the calcium phosphate-based material, produced after the immersion in the SBF for 24 hours, is analyzed to be apatite (Ca/P=1.65~1.69), which is the main component of bone.

As described hereinbefore, the present invention provides porous material having hierarchical pore structure and preparation method thereof. In the present invention, the method of preparing the porous material accords to a very simple and accurate process of forming a macropore structure using an easily controllable three-dimensional rapid prototyping technique, thus exhibiting superior reproducibility, productivity and economic benefits. Further, the porous ceramic material of the present invention has interconnected pores of respective size regions and uneven surfaces corresponding to each size region. Therefore, conditions favorable for adhesion, division, proliferation, movement, and differentiation of cells are provided, and thereby the porous material of the invention may be valuably used in various fields, in addition to being used as bone fillers, restorative materials, and scaffolds.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. Porous material having hierarchical pore structure of a nano/macro size, which comprises three-dimensionally interconnected open pores, including nanopores having a size of 1~100 nm and macropores having a size of >100 μm, formed in a biodegradable polymer having a bioceramic material or biomaterial powder, in which calcium and phosphorus are uniformly dispersed in silicon, uniformly distributed therein, the nanopores being formed using a block copolymer of polyethylene oxide and polypropylene oxide as a template for inducing formation of the nanopores, and the macropores being formed using a three-dimensional rapid prototyping machine.

2. The porous material as set forth in claim 1, wherein the bioceramic material is calcium phosphate-based oxide, including apatite, or bioglass, and the biomaterial is any one selected from a group consisting of glass oxide, titania, zirconia, and alumina.

3. The porous material as set forth in claim 1, wherein the biodegradable polymer is poly(ε-caprolactone).

4. A method of preparing porous material of claim 1 having hierarchical pore structure of a nano/macro size, which comprises three-dimensionally interconnected open pores, including nanopores and macropores, the method comprising:

dissolving a block copolymer of polyethylene oxide and polypropylene oxide in an organic solvent, including alcohol, thus synthesizing a block copolymer template solution (step 1);

mixing a silicon compound, a calcium compound, and a phosphorus compound, thus synthesizing a bioceramic material or biomaterial solution (step 2);

adding the bioceramic material or biomaterial solution to the block copolymer template solution, thus obtaining a precursor solution (step 3);

drying and burning the precursor solution, thus obtaining a porous material (step 4);

grinding and powdering the porous material to a nano size or a micro size (step 5);

mixing the ground and powdered porous material with a biodegradable polymer, thus obtaining a paste (step 6); and placing the paste in a three-dimensional rapid prototyping machine, and extruding it, thus forming macropores (step 7).

5. The method as set forth in claim 4, wherein the block copolymer of polyethylene oxide and polypropylene oxide of the step 1 is a pluronic or tetronic copolymer, which is one or more selected from a group consisting of F127, F108, F98, F88, P123, P105, P104 and pluronic, tetronic, reverse pluronic, or reverse tetronic copolymers having a ratio of polyethylene/polypropylene of 0.1~0.8.

6. The method as set forth in claim 4, wherein the bioceramic material or biomaterial solution of the step 2 contains silicon, calcium, and phosphorus at an element ratio of 50~80:18~45:2~10.

7. The method as set forth in claim 4, wherein the block copolymer template solution of the step 3 is added in an amount of 30~50 mass % based on the bioceramic material or biomaterial solution.

8. The method as set forth in claim 4, wherein the step 3 comprises mixing and stirring at 700~1500 rpm and 30~80° C. for 2~72 hours.

9. The method as set forth in claim 4, wherein the drying of the step 4 is conducted at −15~80° C. and 5~100 RH %.

10. The method as set forth in claim 4, wherein the burning of the step 4 comprises maintaining the dried product in a temperature range of 600~1000° C. at a heating rate of 0.2~2° C./min for 2~6 hours to form a dense framework, and slowly cooling the product.

11. The method as set forth in claim 4, wherein the step 6 is conducted by mixing the biodegradable polymer and the porous material at a ratio of 50~80:50~20 mass %.

* * * * *